(12) United States Patent
Minegishi et al.

(10) Patent No.: US 8,676,568 B2
(45) Date of Patent: Mar. 18, 2014

(54) INFORMATION PROCESSING APPARATUS AND MESSAGE EXTRACTION METHOD

(71) Applicant: Fujitsu Limited, Kawasaki (JP)

(72) Inventors: Akira Minegishi, Setagaya (JP); Michio Sato, Maebashi (JP); Takao Shibazaki, Inagi (JP); Naomi Ozawa, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/868,374

(22) Filed: Apr. 23, 2013

(65) Prior Publication Data

US 2013/0238319 A1 Sep. 12, 2013

Related U.S. Application Data

(63) Continuation of application No. PCT/JP2010/070458, filed on Nov. 17, 2010.

(51) Int. Cl.
| | |
|---|---|
| *G06F 17/28* | (2006.01) |
| *G06F 17/27* | (2006.01) |
| *G06F 17/21* | (2006.01) |
| *G10L 15/04* | (2013.01) |
| *G10L 15/00* | (2013.01) |
| *G10L 15/05* | (2013.01) |
| *G10L 15/18* | (2013.01) |

(52) U.S. Cl.
CPC ............ *G06F 17/27* (2013.01); *G06F 17/2705* (2013.01); *G06F 17/2745* (2013.01); *G06F 17/2765* (2013.01); *G06F 17/277* (2013.01); *G06F 17/2775* (2013.01); *G10L 15/00* (2013.01); *G10L 15/04* (2013.01); *G10L 15/05* (2013.01); *G10L 15/1822* (2013.01)
USPC .......... 704/9; 704/4; 704/5; 704/10; 704/251; 704/254

(58) Field of Classification Search
CPC . G06F 17/27; G06F 17/2705; G06F 17/2745; G06F 17/2765; G06F 17/277; G06F 17/2775; G10L 15/00; G10L 15/04; G10L 15/05; G10L 15/1822

USPC ................................ 704/4, 5, 9, 10, 251, 254
See application file for complete search history.

(56) References Cited

U.S. PATENT DOCUMENTS

| | | | | |
|---|---|---|---|---|
| 6,393,423 | B1 * | 5/2002 | Goedken | 1/1 |
| 2004/0006598 | A1 * | 1/2004 | Damm et al. | 709/206 |

(Continued)

FOREIGN PATENT DOCUMENTS

| | | |
|---|---|---|
| EP | 1 903 441 A1 | 3/2008 |
| JP | 07-105046 | 4/1995 |

(Continued)

OTHER PUBLICATIONS

Yahoo, "Add Message Filter," 1 page, Copyright 1994-2005, at http://us.f355.mail.yahoo.com/ym/Filters?YY=85215&CRE=Create, last visited Sep. 21, 2005.*

(Continued)

*Primary Examiner* — Edgar Guerra-Erazo
(74) *Attorney, Agent, or Firm* — Staas & Halsey LLP

(57) ABSTRACT

A storage unit stores first filter information specifying the formats of messages and second filter information specifying weights for words or phrases. A first search unit selects messages matching the formats specified by the first filter information from a plurality of messages as messages to be extracted. A second search unit calculates the importance level of each message unselected by the first search unit, based on the words or phrases included in the message and the second filter information, and selects messages to be extracted, according to the calculated importance levels from the messages unselected by the first search unit.

8 Claims, 18 Drawing Sheets

(56) References Cited

U.S. PATENT DOCUMENTS

| | | |
|---|---|---|
| 2006/0010217 A1* | 1/2006 | Sood ............................. 709/206 |
| 2007/0016401 A1* | 1/2007 | Ehsani et al. ....................... 704/9 |
| 2007/0168430 A1* | 7/2007 | Brun et al. .................... 709/206 |
| 2007/0179776 A1* | 8/2007 | Segond et al. ..................... 704/9 |
| 2007/0192085 A1* | 8/2007 | Roulland et al. .................. 704/9 |
| 2007/0219773 A1* | 9/2007 | Roux et al. ......................... 704/1 |
| 2008/0071519 A1* | 3/2008 | Brun et al. ......................... 704/9 |
| 2008/0091408 A1* | 4/2008 | Roulland et al. .................. 704/9 |
| 2008/0147813 A1* | 6/2008 | Damm et al. .................. 709/206 |
| 2008/0147814 A1* | 6/2008 | Damm et al. .................. 709/206 |
| 2008/0147815 A1* | 6/2008 | Damm et al. .................. 709/206 |
| 2008/0155337 A1 | 6/2008 | Usui et al. |
| 2008/0177531 A1* | 7/2008 | Nakagawa ......................... 704/9 |
| 2009/0240488 A1* | 9/2009 | White et al. ....................... 704/9 |
| 2009/0282114 A1* | 11/2009 | Feng et al. .................... 709/206 |
| 2009/0292525 A1* | 11/2009 | Goishi .............................. 704/9 |
| 2009/0310173 A1* | 12/2009 | Iwai et al. ..................... 358/1.15 |

FOREIGN PATENT DOCUMENTS

| | | |
|---|---|---|
| JP | 2001-292143 | 10/2001 |
| JP | 2003-067304 | 3/2003 |
| JP | 2008-041041 | 2/2008 |
| JP | 2009-064098 | 3/2009 |
| JP | 2009-217392 | 9/2009 |
| WO | WO 2007/007410 A1 | 1/2007 |

OTHER PUBLICATIONS

International Search Report of Corresponding PCT Application PCT/JP2010/070458 mailed Feb. 15, 2011.

Patent Abstracts of Japan, Publication No. 2009-217392, Published Sep. 24, 2009.

Patent Abstracts of Japan, Publication No. 2008-041041, Published Feb. 21, 2008.

Patent Abstracts of Japan, Publication No. 2009-064098, Published Mar. 26, 2009.

Patent Abstracts of Japan, Publication No. 2003-067304, Published Mar. 7, 2003.

Patent Abstracts of Japan, Publication No. 07-105046, Published Apr. 21, 1995.

Patent Abstracts of Japan, Publication No. 2001-292143, Published Oct. 19, 2001.

* cited by examiner

| NO. | MESSAGE NAME | MESSAGE DEFINITION |
| --- | --- | --- |
| 1 | msg_11100 | DevX: probe of %%DevX_busid%% failed with error %%DevX_d_1%% |
| 2 | msg_11101 | DevX: %%DevX_nwif%%: DevX_self_test: Self-test failed: result=%%DevX_x%% |
| 3 | msg_11102 | DevX: %%DevX_nwif%%: DevX_self_test: Self-test failed: time out |
| 4 | msg_11103 | DevX: %%DevX_nwif%%: DevX_eeprom_load: EEPROM corrupted<br>DevX: probe of %%DevX_busid%% failed with error %%DevX_d%% |
| 5 | msg_11104 | DevX: %%DevX_nwif%%: DevX_open: Cannot open interface, aboting.<br>DevX: probe of %%DevX_busid%% failed with error %%DevX_d%% |
| 6 | msg_11105 | DevX: Etherdev alloc failed, abort. |
| ⋮ | | |
| 25 | msg_11122 | DevX: %%DevX_nwif%%: DevX_resume: Error waking adapter |
| 26 | msg_11123 | DevX: %%DevX_nwif%%: DevX_resume: Error clearing wake event |
| 27 | msg_11124 | DevX: %%DevX_nwif%%: DevX_shutdown: Error enabling wake |

FIG. 7

| NO. | WORD | | | | | | | | | | | | |
|---|---|---|---|---|---|---|---|---|---|---|---|---|---|
| | DevX | probe | of | failed | with | error | DevX_self_test | Self_test | Cannot | ... | wake | event | DevX_suspend | enabling |
| 1 | 1 | 1 | 1 | 1 | 1 | 1 | | | | | | | | |
| 2 | 1 | | | 1 | | | 1 | 1 | | | | | | |
| 3 | 1 | | | 1 | | | 1 | 1 | | | | | | |
| 4 | 1 | 1 | 1 | 1 | 1 | 1 | | | | | | | | |
| 5 | 1 | 1 | 1 | 1 | 1 | 1 | | | 1 | | | | | |
| 6 | 1 | | | 1 | | | | | | | | | | |
| ⋮ | | | | | | | | | | | | | | |
| 25 | 1 | | | | | 1 | | | | | | | | |
| 26 | 1 | | | | | 1 | | | | | 1 | 1 | | |
| 27 | 1 | | | | | 1 | | | | | 1 | | | 1 |
| TOTAL | 27 | 11 | 11 | 18 | 12 | 18 | 2 | 2 | 8 | | 4 | 2 | 2 | 2 |

| ID | WORD | WEIGHT |
|---|---|---|
| 1 | failed | 18 |
| 2 | error | 18 |
| 3 | with | 12 |
| 4 | probe | 11 |
| 5 | of | 11 |
| 6 | DevX_probe | 9 |
| 7 | Cannot | 8 |
| 8 | aborting | 8 |
| 9 | device | 6 |
| 10 | PCI | 4 |
| 11 | wake | 4 |
| ⋮ | | |

FIG. 10

| NO. | WORD AND PHRASE | WORD WEIGHT | PHRASE WEIGHT |
|---|---|---|---|
| 1 | failed | 18 | |
| | failed with | | 30 |
| | failed with error | | 48 |
| 2 | DevX_self_test: | 2 | |
| | DevX_self_test: Self-test | | 4 |
| | DevX_self_test: Self-test failed: | | 22 |
| | Self-test | 2 | |
| | Self-test failed: | | 20 |
| ⋮ | | | |
| 27 | Error enabling | | 20 |
| | Error enabling wake | | 24 |
| | enabling | 2 | |
| | enabling wake | | 6 |

| INDEX | ID | WORD AND PHRASE | WEIGHT |
|---|---|---|---|
| A | 1 | abort | 2 |
|  | 2 | aborting | 17 |
|  | 3 | after | 2 |
| ⋮ |  |  |  |
| C | 1 | can | 10 |
|  | 2 | cannot | 10 |
|  | 3 | cannot find | 30 |
|  | 4 | cannot open | 30 |
| ⋮ |  |  |  |
| S | 1 | Start | 10 |
|  | 2 | Start failed | 10 |
|  | m | Start failed (/etc/opt/FJSVpsa/global/pmpsa.conf):File | 80 |
|  | m + 1 | Start failed (/etc/opt/FJSVpsa/global/pmpsa.conf):Files | 80 |
|  | m + 2 | Start failed (/etc/opt/FJSVpsa/global/pmpsa.conf):File cannot find | 100 |
| ⋮ |  |  |  |

FIG. 16

INFORMATION PROCESSING APPARATUS AND MESSAGE EXTRACTION METHOD

CROSS-REFERENCE TO RELATED APPLICATION

This application is a continuation application of International Application PCT/JP2010/070458 filed on Nov. 17, 2010 which designated the U.S., the entire contents of which are incorporated herein by reference.

FIELD

The embodiments discussed herein are related to an information processing apparatus and message extraction method.

BACKGROUND

In information processing systems, messages are exchanged between different computers and between different software applications running on the same computer. For example, a computer, when detecting an error, may send an error message to another computer that performs management tasks. Message exchange makes it easier for a sending side and receiving side to share information about hardware and software states.

The message exchange may involve filtering messages at the sending side or receiving side. This means that messages to be subjected to further processing may be selected from a plurality of messages according to their contents. For example, an operating system or device driver running on a computer may output a log file containing a plurality of messages. In doing so, the computer may extract messages satisfying preset conditions (for example, messages indicating high priority errors), and send the messages to another computer. Such filtering leads to reducing the processing load on computers, the risk of erroneous state judgment, etc.

There has been proposed an apparatus for supporting definition of conditions for making log notifications. This apparatus collects and classifies log records output from a system being monitored by time zone, counts the number of log records indicating the same message for each time zone, and creates and displays candidate conditions for capturing all log records for each time zone.

Further, there has also been proposed a message monitoring system for promoting optimization of filters used for detecting messages. This message monitoring system accumulates information indicating detected messages and filters used for detecting the messages, extracts redundant filters that detect only the same messages as other filters, and outputs information indicating the redundant filters.

Still further, there has also been proposed an electronic mail filtering system which allows the filtering of electronic mails to be customized for each user. This electronic mail filtering system refers to a user-specific list of words with weights, and determines unwanted mail candidates out of received electronic mails. The electronic mail filtering system then analyzes the words included in unwanted electronic mails selected from the unwanted mail candidates, and reconfigures the list of words with weights.

Still further, there has also been an operation management system which sends a message for reporting insufficiency of filter definitions to a monitoring terminal device when the same mail that has not been registered in the filter definitions arrives a predetermined number of times or more in a predetermined time period.

Please see, for example, Japanese Laid-open Patent Publications Nos. 2008-41041, 2009-217392, 2003-67304, and 2009-64098 (paragraph [0015]).

Consider an information processing system in which filter information specifying the formats of messages to be extracted is prepared in order to extract messages to be subjected to further processing from a plurality of messages. Strictly defining the formats reduces a possibility of extracting unwanted messages. However, this approach of defining the formats of messages to be extracted in filter information has a problem that if software that outputs messages is updated, desired messages may not be extracted.

For example, in the case where a security patch is applied to an operating system or in the case where a device driver is updated, the formats of messages written in a log file may be changed. The format changes include a change in the number of spaces between words, a change in a delimiter, a change in word order, an addition of new words, etc. Messages in the changed formats do not match the formats defined in the existing filter information, and therefore are not extracted. However, it is desirable that messages substantially indicating the same contents are extracted even if the messages have changed formats.

This problem is a big issue for information processing systems which likely cause a time lag from change of the formats of messages to generation of filter information reflecting the changed formats. In this connection, the problem may generally occur not only in the case of extracting messages from a log file but also in the case of extracting desired messages from a plurality of messages.

SUMMARY

According to one aspect, there is provided an information processing apparatus for obtaining a plurality of messages and extracting one or more messages from the plurality of messages. The information processing apparatus includes: a memory configured to store first filter information specifying formats of messages and second filter information specifying weights for words or phrases; and a processor configured to perform a procedure including selecting, from the plurality of messages, messages matching the formats specified by the first filter information as messages to be extracted, calculating an importance level of each message that has not been selected based on the first filter information, based on words or phrases included in the message and the second filter information, and selecting messages to be extracted, according to calculated importance levels from messages that have not been selected based on the first filter information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a search filter;

FIG. 9 illustrates the count numbers of appearances of words;

FIG. 10 illustrates a first example of an unknown message search filter;

FIG. 15 illustrates calculated weights for words and phrases;

FIG. 16 illustrates a second example of an unknown message search filter;

DESCRIPTION OF EMBODIMENTS

Figure 1:
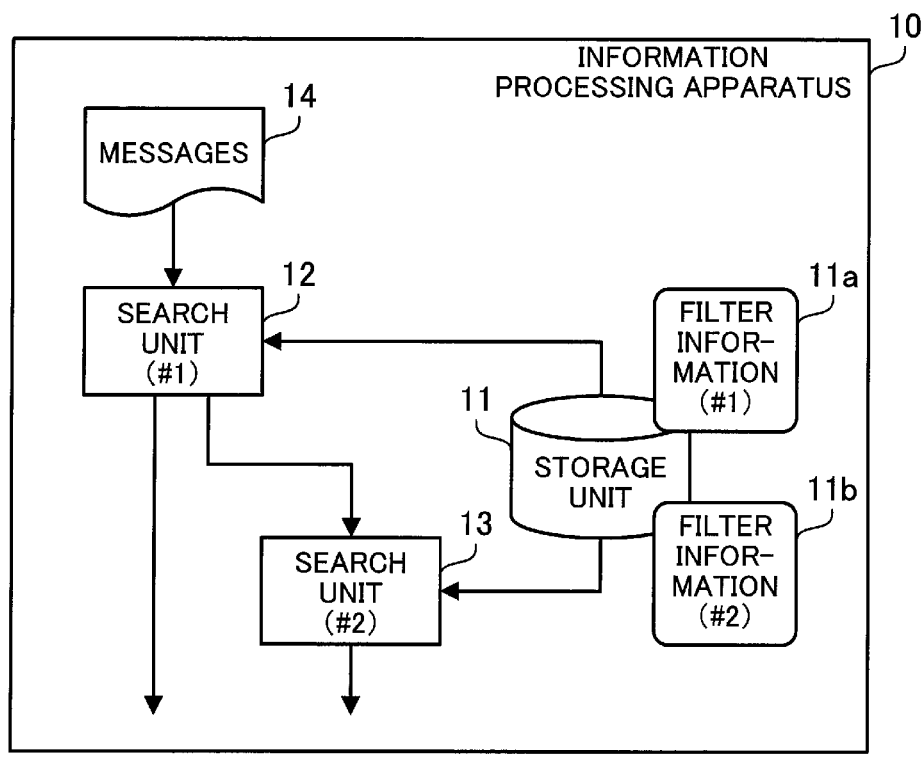
FIG. 1 illustrates an information processing apparatus according to a first embodiment.

Several embodiments will be described below with reference to the accompanying drawings, wherein like reference numerals refer to like elements throughout.

First Embodiment

FIG. 1 illustrates an information processing apparatus according to a first embodiment. An information processing apparatus 10 according to this first embodiment obtains a plurality of messages 14, and extracts one or more messages from the plurality of messages 14. The plurality of messages 14 may be messages that are included in a log file output from an operating system (OS) or device driver running on the information processing apparatus 10. The information processing apparatus 10 includes a storage unit 11, search unit 12 (first search unit), and search unit 13 (second search unit).

The storage unit 11 stores filter information 11a (first filter information) and filter information 11b (second filter information). The filter information 11a specifies message formats. The filter information 11b specifies weights for words or phrases or both of them. The filter information 11b may indicate a correspondence between a weight and each word or phrase, or may be a list of words or phrases with high weights. For example, the filter information 11b may be generated using the formats defined by the filter information 11a. In addition, the filter information 11b may be generated by the information processing apparatus 10 or another information processing apparatus.

The search unit 12 selects messages matching formats specified by the filter information 11a stored in the storage unit 11 from the plurality of messages 14 as messages to be extracted. For example, the search unit 12 performs exact matching between each of the plurality of messages 14 with the filter information 11a, for example, including checking on the number of spaces between words and word order. Such exact matching reduces the risk of extracting unwanted messages.

The search unit 13 calculates the importance level of each message that has not been selected by the search unit 12, on the basis of the words or phrases or both of them included in the message and the filter information 11b stored in the storage unit 11. For example, the search unit 13 extracts words or phrases from a message that has not been selected by the search unit 12, obtains the weight of each extracted word or phrase with reference to the filter information 11b, and calculates a sum of the specified weights as the importance level. The search unit 13 then selects messages to be extracted, from the messages that have not been selected by the search unit 12 according to the calculated importance levels. For example, the search unit 13 may select messages whose importance levels are greater than or equal to a threshold.

The messages selected by the search unit 12 or search unit 13 are to be subjected to further processing. For example, the information included in the selected messages may be partly or fully supplied to another information processing apparatus. On the other hand, messages that are not selected by the search unit 12 or search unit 13 may be deleted. For example, the storage unit 11 and search units 12 and 13 take the role to extract messages indicating errors with high importance levels from a log file and notify another information processing apparatus of these extracted messages.

In this connection, the search units 12 and may be implemented by the information processing apparatus 10 executing a message extraction program. In other words, the search units 12 and 13 may be implemented by using a Central Processing Unit (CPU) and a memory.

With the information processing apparatus 10, the search unit 12 selects, with reference to the filter information 11a stored in the storage unit 11, messages matching formats specified by the filter information 11a from a plurality of messages 14 as messages to be extracted. The search unit 13 calculates the importance level of each message that has not been selected based on the filter information 11a, on the basis of the words or phrases included in the message and the filter information 11b stored in the storage unit 11, and selects messages to be extracted, from the messages that have not been selected based on the filter information 11a, according to the calculated importance levels.

This approach reduces the failure of message extraction. More specifically, the formats of messages to be extracted may be changed due to an update of software that outputs the plurality of messages 14. In this case, the search unit 12 may fail to capture desired messages after the formats are changed and before new filter information 11a reflecting the changed formats is generated. The search unit 13, however, has a possibility of capturing such desired messages, which the search unit 12 failed to capture. This is because, since the filter information 11b is generated using the words and phrases included in the filter information 11a, the search unit 13 is able to flexibly deal with formality changes such as a change in the number of spaces between words, a change in a delimiter, a change in word order, etc.

The following second and third embodiments describe examples of an information processing system in which a computer extracts error messages from a log file, and notifies another computer of the extracted error messages. In this connection, the message extraction method according to the first embodiment may be applied for messages other than those included in log files.

Second Embodiment

Figure 2:
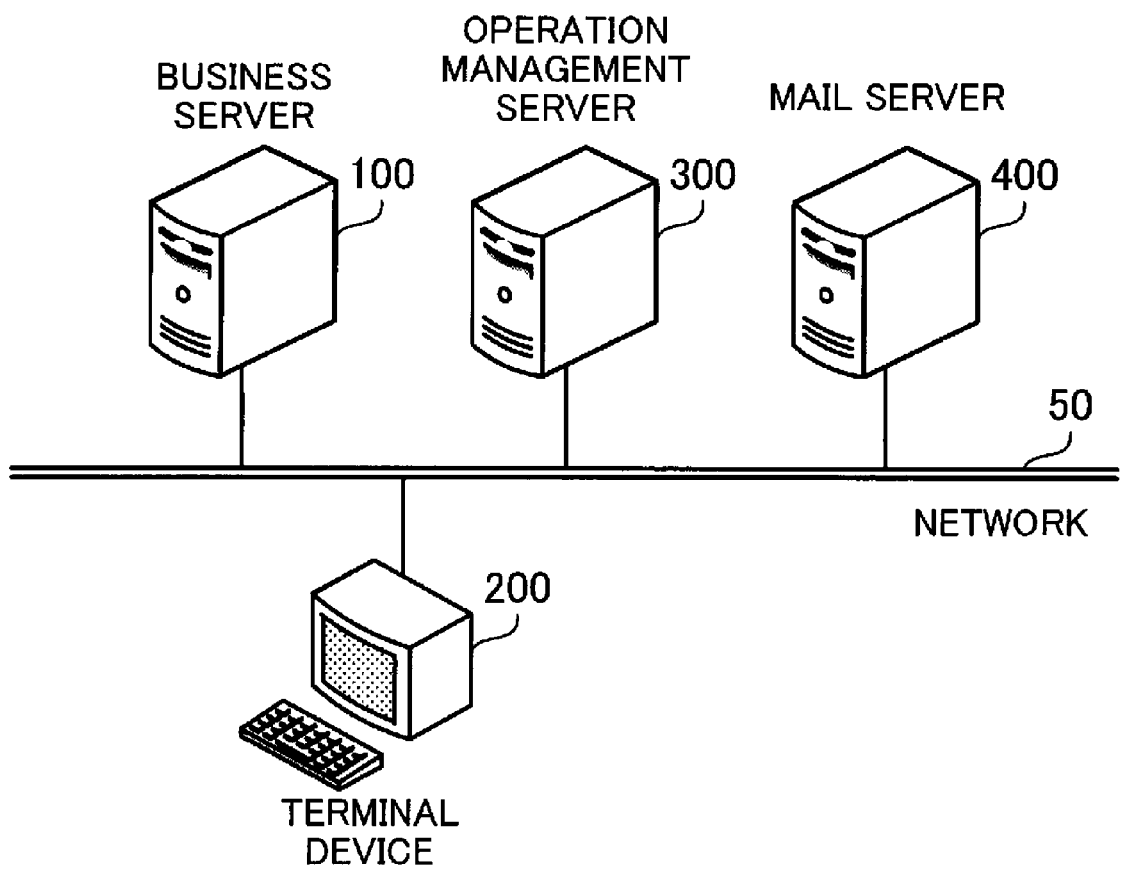
FIG. 2 illustrates an information processing system according to a second embodiment.

FIG. 2 illustrates an information processing system according to the second embodiment. The information processing system according to the second embodiment includes a business server 100, terminal device 200, operation management server 300, and mail server 400. These business server 100, terminal device 200, operation management server 300, and mail server 400 are connected to a network 50.

The business server 100 is a server computer that executes application software, and includes plural sets of computing resources including a CPU and memory. The business server 100 is able to run a plurality of OSs in parallel with the plural sets of computing resources. Management of log files and error detection are performed on each OS.

The terminal device 200 is a client computer that an administrator of the information processing system uses. The terminal device 200 obtains information on the operational status of the information processing system (especially, the operational status of the business server 100) from the operation management server 300. In this connection, the terminal device 200 may obtain the information on the operational status of the business server 100 directly from the business server 100. In addition, the terminal device 200 receives electronic mails directed to the administrator from the mail server 400. The administrator checks the information received from the business server 100 and operation management server 300 and electronic mails received from the mail server 400 to monitor whether a fault has occurred or not.

The operation management server 300 is a server computer that supports management of the information processing system. For example, the operation management server 300 collects information on the operational status of the information processing system (especially, the operational status of the business server 100) using the Simple Network Management Protocol (SNMP). The operation management server 300 supplies the collected information to the terminal device 200.

The mail server 400 is a server computer that transfers electronic mails. The mail server 400 has a mail box for storing electronic mails directed to the administrator of the information processing system. For example, the mail server 400 receives electronic mails regarding the operational status from the business server 100, and stores them in the administrator's mail box. Then upon receipt of a request from the terminal device 200, the mail server 400 sends the electronic mails stored in the administrator's mail box to the terminal device 200.

Figure 3:
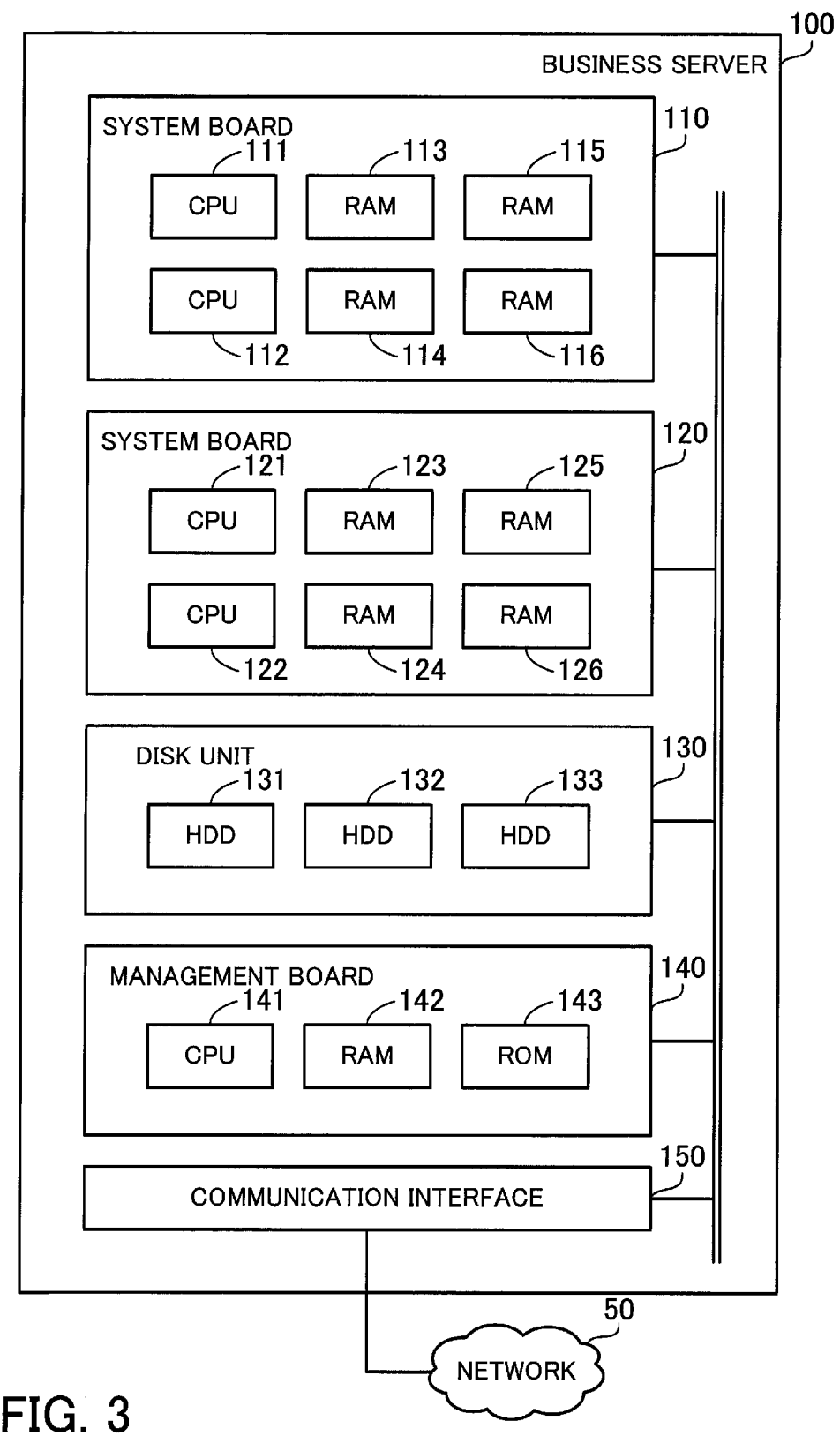
FIG. 3 is a block diagram illustrating hardware components of a business server.

FIG. 3 is a block diagram illustrating hardware components of a business server. The business server 100 includes system boards 110 and 120, disk unit 130, management board (MMB) 140, and communication interface 150. These system boards 110 and 120, disk unit 130, management board 140, and communication interface 150 are connected to a bus within the business server 100.

The system boards 110 and 120 are sets of computing resources that are used for executing OSs and application software. Referring to the example of FIG. 3, the business server 100 is provided with two system boards. Alternatively, three or more system boards may be provided. A plurality of system boards is assigned to one or more partitions.

One OS runs on one partition. For example, in the case where the system boards 110 and 120 are assigned to the same partition, an OS runs with the computing resources of both the system boards 110 and 120. In the case where the system boards 110 and 120 are assigned to different partitions, on the other hand, different OSs run on the respective system boards 110 and 120. In this connection, hardware virtualization technology enables a plurality of OSs to run on a single system board.

The system board 110 includes CPUs 111 and 112 and Random Access Memories (RAM) 113 to 116. These CPUs 111 and 112 and RAMs 113 to 116 are connected to a bus (not illustrated) within the system board 110. The CPUs 111 and 112 are computing devices that execute programs including OS programs, application programs, etc. The RAMs 113 to 116 are memories that temporarily store at least part of the programs executed by the CPUs 111 and 112 and data. In place of or in addition to the RAMs 113 to 116, other types of memories may be used as main storage devices.

The system board 120 includes CPUs 121 and 122 and RAMs 123 to 126. These CPUs 121 and 122 and RAMs 123 to 126 operate in the same way as the CPUs 111 and 112 and RAMs 113 to 116.

The disk unit 130 is a set of non-volatile storage devices for storing the programs executed by the system boards 110 and 120 and data. The disk unit 130 includes Hard Disk Drives (HDD) 131 to 133. The HDDs 131 to 133 magnetically writes and reads data on built-in disks. In place of or in addition to the HDDs 131 to 133, other types of non-volatile storage devices such as flash memories may be used as auxiliary storage devices.

The management board 140 is a set of computing resources to be used for managing the business server 100. For example, the management board 140 assigns the system boards 110 and 120 to partitions in accordance with an instruction from the terminal device 200 operated by the administrator. The management board 140 also collects error information included in log files output from OSs and device drivers, from the system boards 110 and 120, and sends the collected error information to the operation management server 300. The management board 140 may supply such error information directly to the terminal device 200.

The management board 140 includes a CPU 141, RAM 142, and Read Only Memory (ROM) 143. These CPU 141, RAM 142, and ROM 143 are connected to a bus (not illustrated) within the management board 140. The CPU 141 is a computing device that executes programs for managing the business server 100. The RAM 142 is a memory that temporarily stores at least part of programs executed by the CPU 141 and data. The ROM 143 is a non-volatile memory that stores the programs executed by the CPU 141 and data. In place of or in addition to the RAM 142 and ROM 143, other types of storage devices may be used.

The communication interface 150 is connected to the network 50. The communication interface 150 communicates with the terminal device 200, operation management server 300, and mail server 400 over the network 50.

Figure 4:
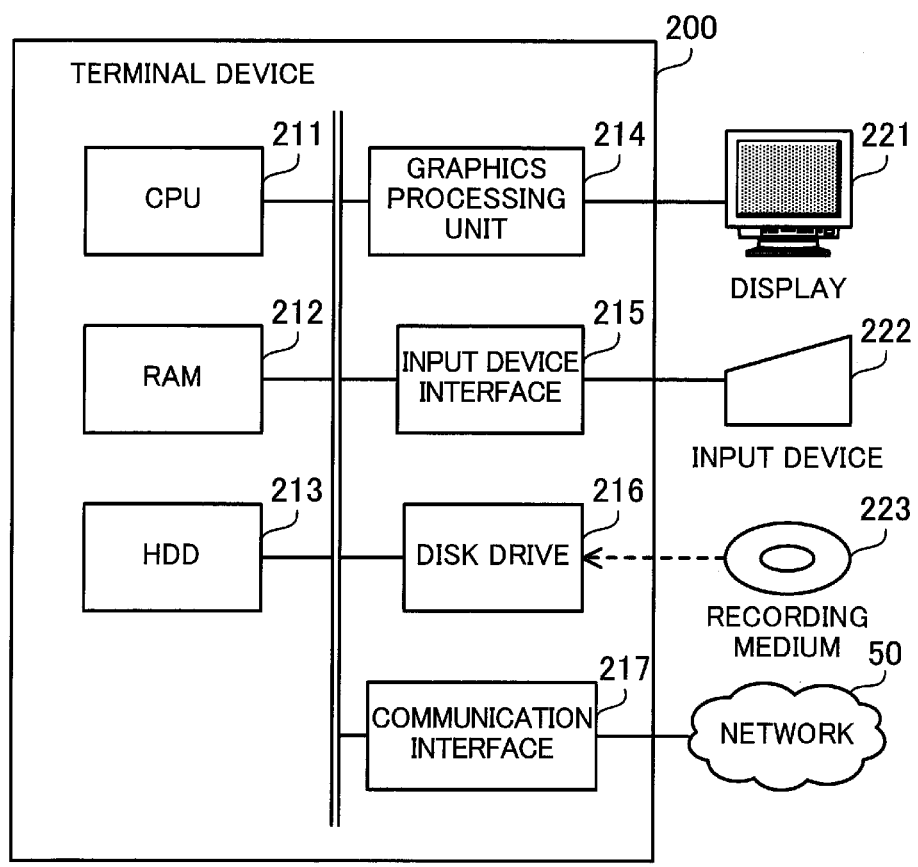
FIG. 4 is a block diagram illustrating hardware components of a terminal device.

FIG. 4 is a block diagram illustrating hardware components of a terminal device. The terminal device 200 includes a CPU 211, RAM 212, HDD 213, graphics processing unit 214, input device interface 215, disk drive 216, and communication interface 217. These CPU 211, RAM 212, HDD 213, graphics processing unit 214, input device interface 215, disk drive 216, and communication interface 217 are connected to a bus within the terminal device 200. In this connection, the operation management server 300 and mail server 400 may be configured with the same hardware components as the terminal device 200.

The CPU 211 is a computing device that executes programs including OS programs, application programs, etc.

The RAM 212 is a memory that temporarily stores at least part of programs executed by the CPU 211 and data. In place of or in addition to the RAM 212, other types of memories may be used as main storage devices.

The HDD 213 is a non-volatile storage device that stores programs executed by the CPU 211 and data. The HDD 213 magnetically writes and reads data on built-in disks. In place of or in addition to the HDD 213, other types of non-volatile storage devices such as flash memories may be used as auxiliary storage devices.

The graphics processing unit 214 is connected to a display 221, and displays images on the display 221 under the control of the CPU 211. For example, Cathode Ray Tube (CRT) display or Liquid Crystal Display (LCD) may be used as the display 221.

The input device interface 215 is connected to an input device 222, and transfers input signals from the input device 222 to the CPU 211. A keyboard may be used as the input device 222, for example. Alternatively, a pointing device such as a mouse or touch panel may be used as the input device 222. A plurality of input devices may be connected to the input device interface 215.

The disk drive 216 is a driving device that reads programs and data from a recording medium 223. The recording medium 223 may be a magnetic disk such as a flexible disk (FD), an optical disc such as a compact disc (CD) or Digital Versatile Disc (DVD), or a Magneto-Optical disk (MO).

The communication interface 217 is connected to the network 50. The communication interface 217 communicates with the business server 100, operation management server 300, and mail server 400 over the network 50.

In this connection, programs to be executed by the business server 100 may be recorded on the recording medium 223. In this case, the terminal device 200 may read the programs from the recording medium 223, and transfer them to the business server 100. Alternatively, a disk drive may be provided in the business server 100 so that the business server 100 reads the programs from the recording medium 223.

Figure 5:
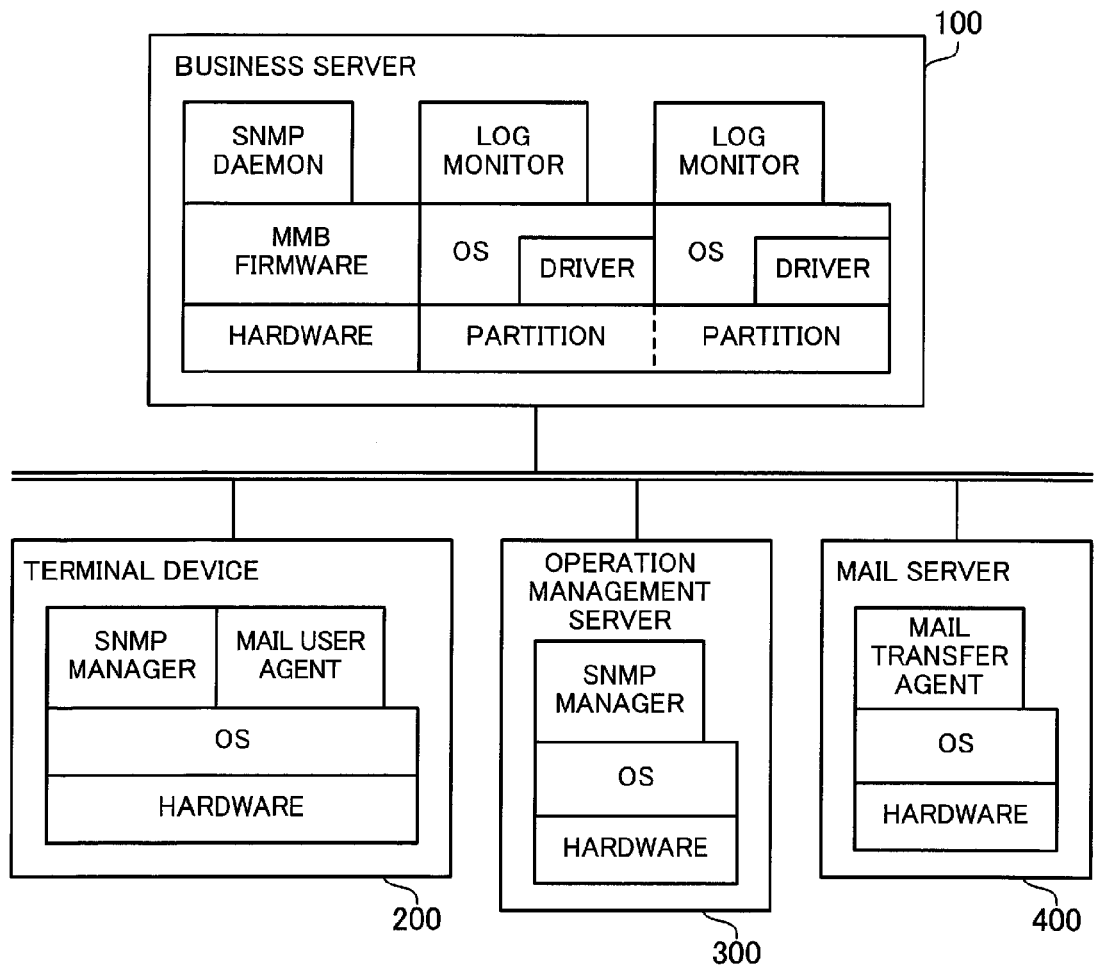
FIG. 5 illustrates a logical layer structure of the information processing system.

FIG. 5 illustrates a logical layer structure of an information processing system. Software components illustrated in FIG. 5 run on the business server 100, terminal device 200, operation management server 300, and mail server 400.

The business server 100 uses the computing resources of the management board 140 to run firmware (MMB firmware) for managing the business server 100. In addition, an SNMP daemon runs on the MMB firmware. The SNMP daemon is resident software that collects information on hardware and software errors, and sends an SNMP trap to the terminal device 200 or operation management server 300.

The business server 100 runs an OS and a device driver residing in the OS with the computing resources of each partition. Referring to the example of FIG. 5, two OSs run in parallel. The OSs and device drivers write messages in log files stored in the disk unit 130. Such messages to be written include error messages.

A log monitor is performed on each OS. The log monitor is resident software that monitors a log file and extracts error messages from the log file. When extracting an error message, the log monitor outputs part or full of the information included in the extracted message to the MMB firmware. Alternatively, the log monitor may send the information included in the extracted message directly to the terminal device 200 or operation management server 300. The log monitor also may send the information included in the extracted message to the mail server 400 as an electronic mail directed to the administrator. The log monitor may select a notification method of error information according to the contents of an error (for example, error level).

The terminal device 200 runs an OS. An SNMP manager and mail user agent run on the OS. The SNMP manager of the terminal device is resident software that detects an error occurring in the business server 100, based on an SNMP trap received from the business server 100 and information received from the operation management server 300. The mail user agent is software that sends a Post Office Protocol (POP) command to the mail server 400 and receives electronic mails directed to the administrator from the mail server 400, in accordance with administrator's operations.

The operation management server 300 runs an OS. An SNMP manager runs on the OS. The SNMP manager of the operation management server 300 is resident software that detects an error occurring in the business server 100 based on an SNMP trap received from the business server 100. When detecting an error or when receiving a request from the terminal device 200, the SNMP manager sends error information to the terminal device 200.

The mail server 400 runs an OS. A mail transfer agent runs on the OS. The mail transfer agent is resident software that transfers electronic mails. The mail transfer agent receives electronic mails directed to the administrator from the business server 100, and stores the electronic mails in a storage area saved as a mail box in a storage device (for example, HDD). The mail transfer agent also receives a POP command from the terminal device 200, and sends electronic mails to the terminal device 200.

Figure 6:
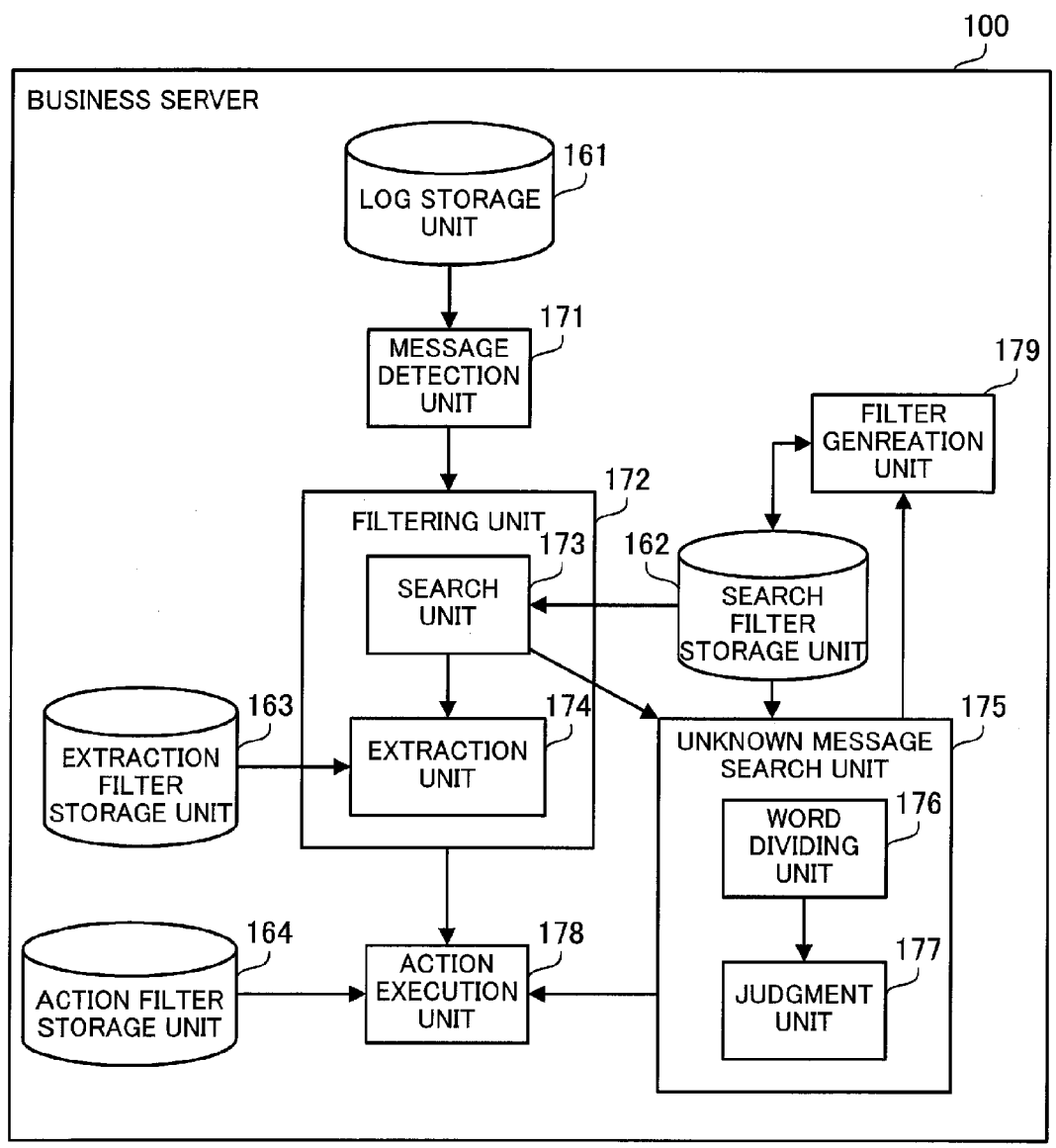
FIG. 6 is a block diagram illustrating a log monitoring function of a business server.

FIG. 6 is a block diagram illustrating a log monitoring function of a business server. The business server 100 executes a log monitor program, so as to implement a log storage unit 161, search filter storage unit 162, extraction filter storage unit 163, action filter storage unit 164, message detection unit 171, filtering unit 172, unknown message search unit 175, action execution unit 178, and filter generation unit 179.

The log storage unit 161 is a storage area in the HDDs 131 to 133, for example. The search filter storage unit 162, extraction filter storage unit 163, and action filter storage unit 164 are storage areas in the RAMs 113 to 116, 123 to 126 or HDD 131 to 133, for example. In this connection, the filtering unit 172 and unknown message search unit 175 are examples of the search unit 12 and search unit 13 of the first embodiment, respectively.

The log storage unit 161 stores a log file. The log file includes a plurality of messages written by an OS or device driver. The messages include several types of messages with different levels, such as reference information, warning, error, etc. In the log file, messages are separated with each other, for example, by line feeds.

The search filter storage unit 162 stores a search filter and unknown message search filter. The search filter is filter information that defines the formats of messages to be processed. The unknown message search filter is filter information that specifies weights for words that are expected to be used in messages. The unknown message search filter is generated by the filter generation unit 179, and is stored in the search filter storage unit 162.

The extraction filter storage unit 163 stores an extraction filter. The extraction filter is filter information that specifies a range of information that needs to be reported to the MMB firmware or another computer, out of information included in messages selected based on the search filter. A range of information to be reported may be specified for each format defined by the search filter.

The action filter storage unit 164 stores an action filter and unknown message action filter. The action filter is filter information that specifies actions to be executed on messages selected based on the search filter. An action may be specified for each format defined by the search filter. The unknown message action filter is filter information that specifies actions to be executed on messages selected based on the unknown message search filter.

Actions include notification to the MMB firmware, transmission of an SNMP trap, transmission of an electronic mail, etc. In addition to these, actions specified by the unknown message action filter may include storage into the business server 100. For example, it is considered that when accessed from the terminal device 200, the business server 100 transmits message selected based on the unknown message search filter to the terminal device 200.

In this connection, the search filter, extraction filter, and action filter are previously registered in the business server 100. When there causes any factor that changes the formats of messages to be written in a log file, the terminal device 200 registers a search filter, extraction filter, and action filter corresponding to the changed formats in the business server 100. The factor that changes the formats may be issuance of a security patch to be applied to an OS, upgrading of a device driver, etc., for example. It should be noted that there is a time lag (for example, one to several months) from the change of the formats to the update of these filters.

The message detection unit 171 monitors the log file stored in the log storage unit 161. When detecting that an OS or device driver wrote new messages, the message detection unit 171 extracts the new messages from the log file, and sequentially output them to the filtering unit 172.

The filtering unit 172 performs filtering (first filtering) on the messages received from the message detection unit 171. The filtering unit 172 includes a search unit 173 and extraction unit 174.

The search unit 173 performs string matching between the messages received from the message detection unit 171 and the formats specified by the search filter stored in the search filter storage unit 162. In the string matching, the search unit 173 recognizes "a match" when a message and a format match exactly including the number of spaces between words, word order, and others. The search unit 173 outputs the messages matching any one of the formats defined by the search filter, to the extraction unit 174. On the other hand, the search unit 173 outputs the remaining messages, which do not match any of the formats defined by the search filter, to the unknown message search unit 175.

The extraction unit 174 extracts strings existing in a range specified by the extraction filter stored in the extraction filter storage unit 163, from the messages received from the search unit 173. The extraction unit 174 then outputs the extracted strings to the action execution unit 178 as information to be reported.

The unknown message search unit 175 performs filtering (second filtering) on the messages received from the filtering unit 172. The unknown message search unit 175 includes a word dividing unit 176 and judgment unit 177.

The word dividing unit 176 divides a message received from the filtering unit 172 into a plurality of words using a predetermined delimiter such as space or comma. The word dividing unit 176 then outputs the words obtained from the message to the judgment unit 177.

The judgment unit 177 obtains the weight of each word received from the word dividing unit 176 with reference to the unknown message search filter stored in the search filter storage unit 162. A minimum value (for example, 0) is taken as a weight for words that are not included in the unknown message search filter. The judgment unit 177 calculates the importance level of the message by using the weights of the words included in the message. The judgment unit 177 then outputs messages whose importance levels are greater than or equal to a threshold to the action execution unit 178. On the other hand, the judgment unit 177 deletes messages whose importance levels are less than the threshold.

The action execution unit 178 executes actions specified by the action filter stored in the action filter storage unit 164 on the information received from the filtering unit 172. The action execution unit 178 also executes actions specified by the unknown message action filter stored in the action filter storage unit 164 on the messages received from the unknown message search unit 175. Though this process, error information is extracted from the log file and reported to the MMB firmware or another computer, for example.

The filter generation unit 179 generates and updates the unknown message search filter. The filter generation unit 179 obtains the search filter from the search filter storage unit 162, and calculates a weight for each word based on the appearance of the word in the search filter. Then, the filter generation unit 179 generates and stores an unknown message search filter indicating a correspondence between each word and its weight in the search filter storage unit 162. In addition, when the unknown message search unit 175 detects a message whose importance level is greater than or equal to a threshold, the filter generation unit 179 updates the unknown message search filter using the words included in the message.

FIG. 7 illustrates an example of a search filter. A search filter 181 is stored in the search filter storage unit 162. The search filter 181 has fields for format number (No.), message name, and message definition.

A format number identifies the format of a message in the search filter. Referring to the example of FIG. 7, 27 formats are defined in the search filter. A message name indicates a message type. A message definition is a string representing the format of a message. Message definitions include "%% . . . %%" as a variable (that is, parameter). For example, an error code, Internet Protocol (IP) address, host name, or value is inserted as a variable in messages by an OS or device driver. The search unit 173 performs matching between a message included in a log file and a format, taking account of such variables.

The following describes how the business server 100 operates. The description is made first on a process of generating an unknown message search filter from a search filter, and then moves on to a process of extracting messages using the search filter and unknown message search filter.

Figure 8:
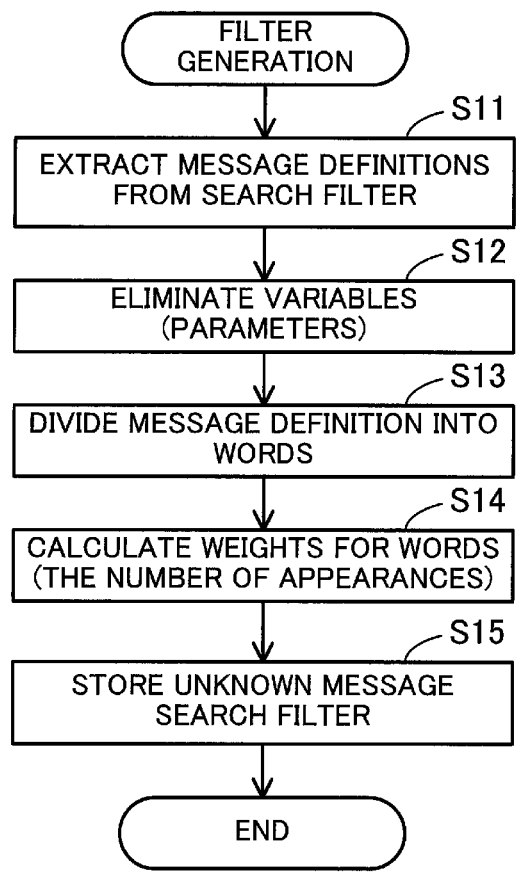
FIG. 8 is a flowchart illustrating a filter generation process according to the second embodiment.

FIG. 8 is a flowchart illustrating a filter generation process according to the second embodiment. The filter generation process is performed by the business server 100 in response to an instruction from the terminal device 200, for example. The process of FIG. 8 will be described step by step.

(Step S11) The filter generation unit 179 obtains a search filter 181 from the search filter storage unit 162. The filter generation unit 179 then extracts message definitions from the search filter 181.

(Step S12) The filter generation unit 179 eliminates strings (%% . . . %%) representing variables from the message definitions extracted at step S11.

(Step S13) The filter generation unit 179 divides the message definitions obtained after eliminating the variables, into a plurality of words using a predetermined delimiter. The delimiter may be a space, period, comma, colon, semicolon, etc., for example. The delimiter is previously registered in the filter generation unit 179. Alternatively, the terminal device 200 may specify a delimiter to the business server 100.

(Step S14) The filter generation unit 179 calculates the number of appearances of each word obtained at step S13, i.e., the number of message definitions including the word, as a weight for the word.

(Step S15) The filter generation unit 179 generates an unknown message search filter indicating the weights for the words calculated at step S14, and stores the unknown message search filter in the search filter storage unit 162. In this connection, some of the words obtained at step S13 may not be included in the unknown message search filter. For example, the filter generation unit 179 may not register weights for words with a considerably large number of appearances in the unknown message search filter.

FIG. 9 illustrates the count numbers of appearances of words. A count table illustrated in FIG. 9 is generated by the filter generation unit 179 at above-described step S14. In this count table, vertical columns correspond to the format numbers of the search filter 181, and horizontal columns indicate words obtained at above-described step S13. A value of "1" in this count table indicates that a word specified by the horizontal column appears in the message definition identified by the format number specified by the vertical column. A blank in the count table indicates that the word specified by the horizontal column does not appear in the message definition identified by the format number specified by the vertical column. The lowest row in the count table indicates the total number of appearances of each word.

FIG. 10 illustrates a first example of an unknown message search filter. The unknown message search filter 182 is generated by the filter generation unit 179 and stored in the search filter storage unit 162 at above-described step S15. The unknown message search filter 182 includes fields for identifier (ID), word, and weight. An identifier is identification information identifying a word in the unknown message search filter 182. A word is a word that is written in a horizontal column of the count table illustrated in FIG. 9. A weight corresponds to the total number of appearances indicated in the lowest row in the count table. Referring to the unknown message search filter 182, a plurality of words is arranged in the decreasing order of weight. Alternatively, the plurality of words may be arranged in alphabetical order.

As mentioned earlier, the filter generation unit 179 may not register some of words appearing in the search filter 181, in the unknown message search filter 182. For example, the filter generation unit 179 may not register words whose ratio (appearance ratio) of the number of appearances to the number of message definitions is greater than or equal to a predetermined threshold, in the unknown message search filter 182. In addition, the filter generation unit 179 does not register previously registered words (for example, driver name) in the unknown message search filter 182. This is because it is considered that, by excluding generally used words, it is possible to evaluate the importance level of a message with improved accuracy. Referring to the example of FIG. 10, a word "DevX" appearing in all message definitions is not registered in the unknown message search filter 182.

When generating the unknown message search filter 182, the filter generation unit 179 determines a threshold for the importance levels of messages. For example, the filter generation unit 179 determines the threshold with one of the following grades 1 to 3.

In grade 1, threshold=(the number of message definitions). In the case of the example of FIG. 7 (there are 27 message definitions), a threshold is set to 27.

In grade 2, threshold=(the number of message definitions)×2÷3. In the case of the example of FIG. 7 (there are 27 message definitions), a threshold is set to 18.

In grade 3, threshold=(the number of message definitions) ÷3. In the case of the example of FIG. 7 (there are 27 message definitions), a threshold is set to 9.

The grade 1 provides a greater threshold, whereas the grade 3 provides a smaller threshold. That is to say, a threshold determined with the grade 1 increases a possibility of deleting messages at the judgment unit 177, whereas a threshold determined with the grade 3 decreases a possibility of deleting messages at the judgment unit 177. The administrator previously selects one of the grades 1 to 3 for determining a threshold, considering allowance for false detection (that is, unwanted messages are extracted by error).

Figure 11:
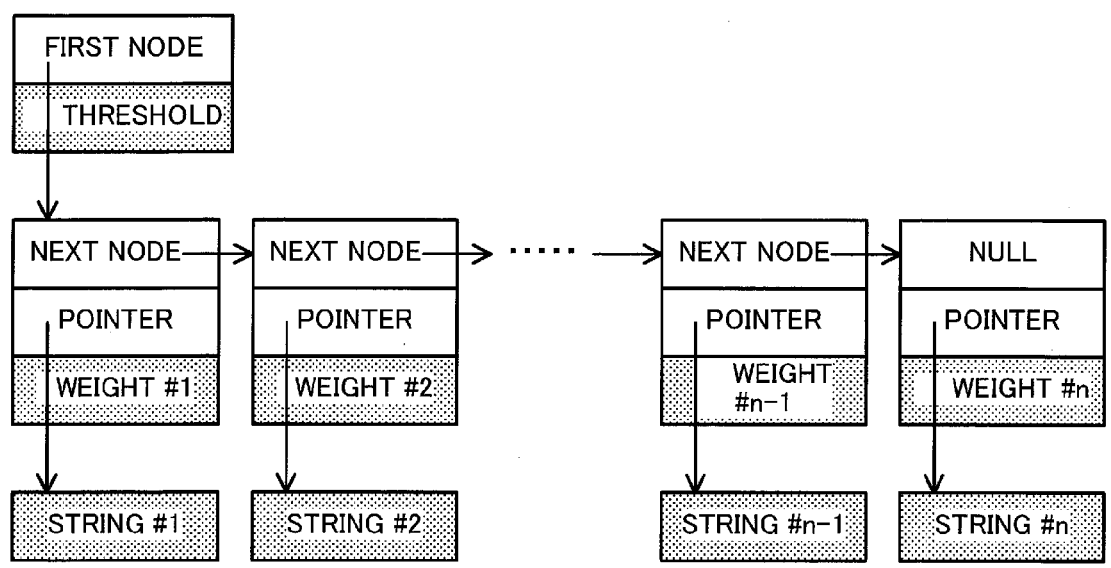
FIG. 11 illustrates a first example of a data structure for an unknown message search filter.

FIG. 11 illustrates a first example of a data structure for an unknown message search filter. The unknown message search filter 182 is stored in a memory in the form of a linear list illustrated in FIG. 11, for example. This data structure of FIG. 11 is just an example, and the data structure for the unknown message search filter 182 is not limited to a linear list.

The linear list for the unknown message search filter 182 includes nodes corresponding to words defined by the unknown message search filter 182. Each node includes a pointer that points to the first address of a string indicating a word of variable length, and a numerical value indicating the weight for the word. A plurality of nodes is linked by unidirectional pointers. A pointer included in the last node is a null pointer. In addition, a set of a pointer that points to the address of the first node and a numerical value indicating a threshold for importance levels is stored in the memory. The judgment unit 177 searches for a desired word by tracking the pointers from the first node toward the last node, and obtains the weight of the word.

In this second embodiment, the log monitor that is executed on each partition of the business server 100 generates the unknown message search filter 182 based on the search filter 181. Alternatively, the MMB firmware or another computer (for example, terminal device 200) may generate and distribute the unknown message search filter 182 to each partition of the business server 100.

Figure 12:
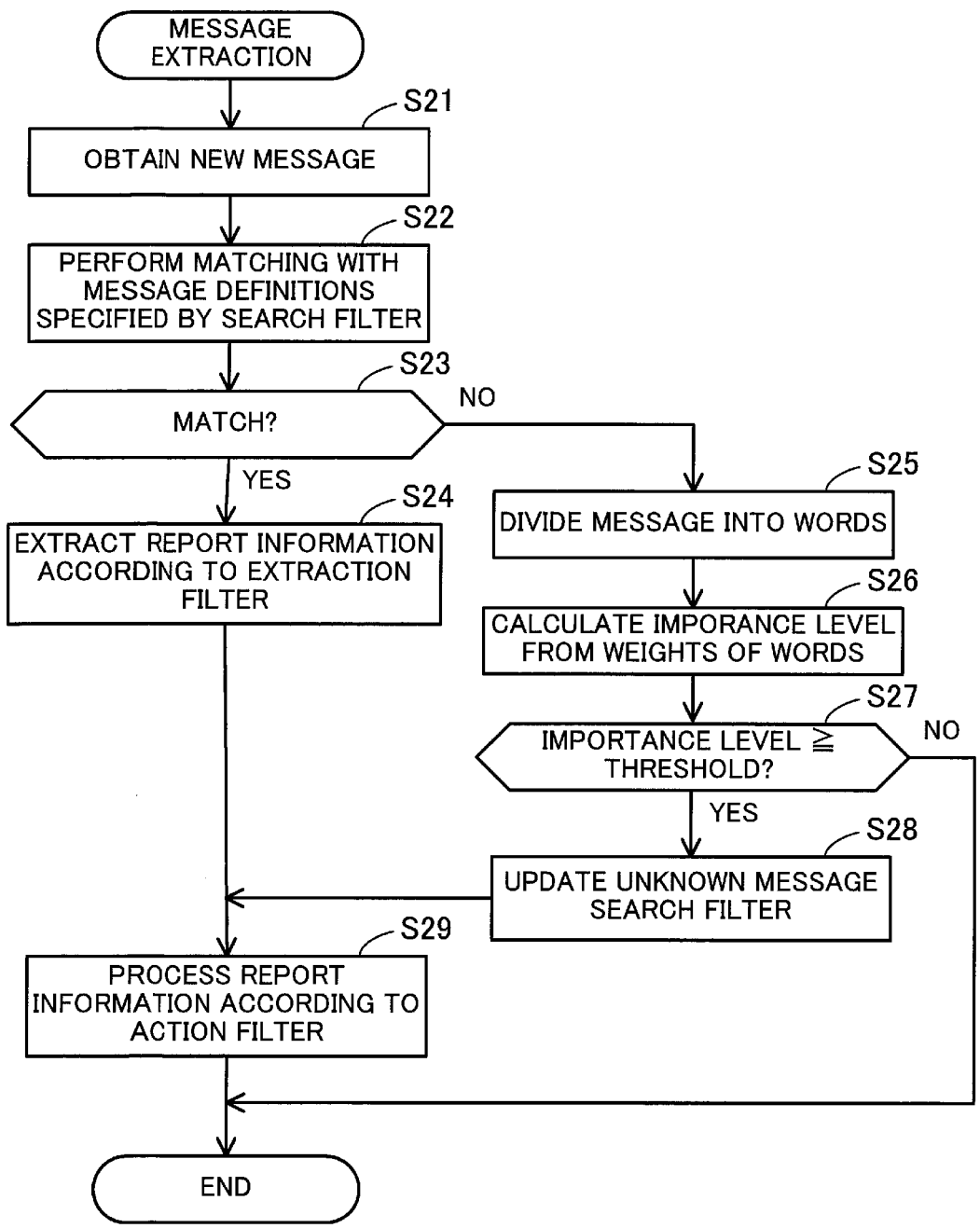
FIG. 12 is a flowchart illustrating a message extraction process according to the second embodiment.

FIG. 12 is a flowchart illustrating a message extraction process according to the second embodiment. The message extraction process is triggered by writing of a message to a log file, and is performed by the business server 100. The process of FIG. 12 will be described step by step.

(Step S21) The message detection unit 171 detects writing of a new message to a log file stored in the log storage unit 161. The message detection unit 171 then extracts the new message from the log file.

(Step S22) The search unit 173 performs matching between the message extracted at step S21 and the message definitions included in the search filter 181 stored in the search filter storage unit 162. The search unit 173 performs the message matching, taking account of possible insertion of strings in variable portions of the message definitions.

(Step S23) The search unit 173 determines whether the message extracted at step S21 matches one of the formats defined by the search filter 181, that is, whether the message matches at least one of the message definitions. If the message matches the format, the process proceeds to step S24. Otherwise, the process proceeds to step S25.

(Step S24) The extraction unit 174 extracts information (report information) of a range specified by the extraction filter stored in the extraction filter storage unit 163, from the message obtained from the search unit 173. For example, the range specified by the extraction filter is set for each format of messages so that information useful for the administrator to identify the cause of an error is extracted from a message. Then, the process proceeds to step S29.

(Step S25) The word dividing unit 176 divides the message obtained from the search unit 173 into a plurality of words using a predetermined delimiter.

(Step S26) The judgment unit 177 searches the unknown message search filter 182 stored in the search filter storage unit 162, to specify the weight of each word obtained at step S25. Then, the judgment unit 177 calculates a sum of the specified weights of the words as the importance level of the message. In this connection, a weight of words that are not registered in the unknown message search filter 182 is taken as "0".

(Step S27) The judgment unit 177 compares the importance level of the message calculated at step S26 with the threshold set in the unknown message search filter 182. If the importance level is greater than or equal to the threshold, the process proceeds to step S28. Otherwise, the judgment unit 177 deletes the message obtained from the search unit 173, and then terminates this process.

(Step S28) The filter generation unit 179 updates the unknown message search filter 182 using the message (unknown message) whose importance level was determined to be greater than or equal to the threshold at step S27. For example, the filter generation unit 179 divides the unknown message into a plurality of words, and adds words that have not been registered, to the unknown message search filter 182.

Alternatively, the filter generation unit 179 may store a list of unregistered words in the search filter storage unit 162, and when an unregistered word is detected a predetermined number of times (for example, three times), move the word from the list to the unknown message search filter 182. Further, the filter generation unit 179 may not register predetermined words (for example, driver name) out of the words obtained from an unknown message in the unknown message search filter 182. A weight for a word added to the unknown message search filter 182 is set to a predetermined relatively small value, for example.

(Step S29) The action execution unit 178 executes an action specified by the action filter stored in the action filter storage unit 164, on the report information obtained from the extraction unit 174 or the message obtained from the judgment unit 177. For example, the action execution unit 178 reports an error to the MMB firmware, sends an SNMP trap to the operation management server 300, sends an electronic mail to the mail server 400, etc.

In this connection, with respect to step S26, an exemplary method of calculating the importance level of a message from the weights of words has been described. An alternative method may be employed to calculate an importance level. Further, the update of the unknown message search filter 182 at above-described step S28 may be performed after step S29. Still further, the filter generation unit 179 may not dynamically update the unknown message search filter 182 (may not execute step S28).

Assume, for example, that a threshold for importance level is 27. In the case where a message includes "failed" and "error", the judgment unit 177 calculates the importance level of this message to be at least 36, with reference to the unknown message search filter 182 illustrated in FIG. 10. In this case, the judgment unit 177 does not delete but outputs the message to the action execution unit 178. On the other hand, in the case where a message includes "probe" and "aborting" and does not include any other words registered in the unknown message search filter 182, the judgment unit 177 calculates the importance level of the message to be 19. In this case, the judgment unit 177 deletes this message.

Figure 13:
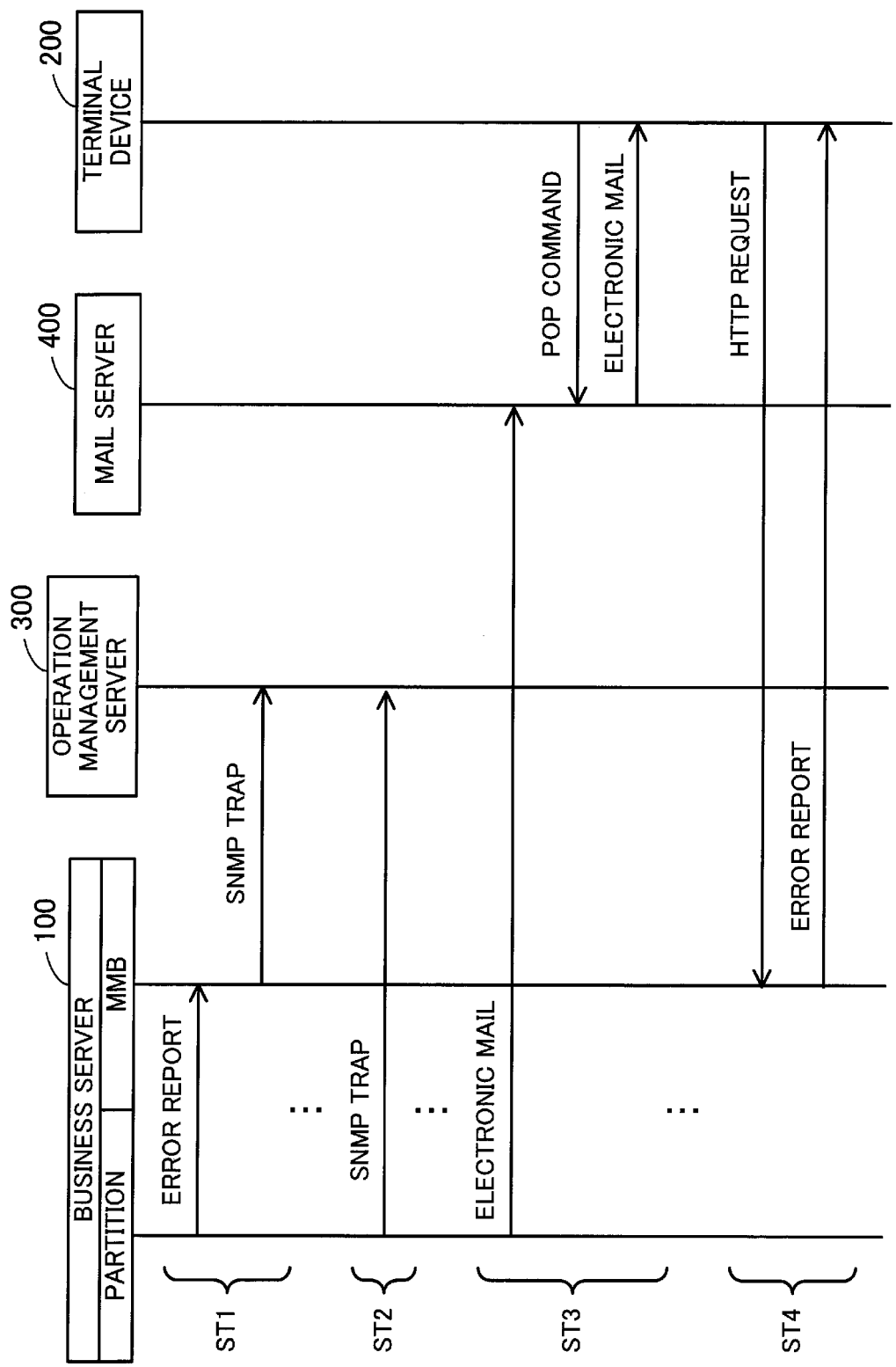
FIG. 13 is a sequence diagram illustrating an example of communication in the information processing system.

FIG. 13 is a sequence diagram illustrating an example of communication in the information processing system. As described earlier, the business server 100 processes information to be reported, with a method specified by an action filter. FIG. 13 illustrates four processing methods (ST1 to ST4).

(ST1) The log monitor running on each partition sends an error report to the MMB firmware. An SNMP daemon running on the MMB firmware sends an SNMP trap indicating the error to the operation management server 300. An SNMP manager running on the operation management server 300 receives the SNMP trap and detects the error occurring in the business server 100. In this connection, the SNMP daemon may send the SNMP tarp to the terminal device 200.

(ST2) The log monitor running on each partition directly sends an SNMP trap to the operation management server 300. The SNMP manager running on the operation management server 300 receives the SNMP trap and detects the error occurring in the business server 100. In this connection, the log monitor may send the SNMP tarp to the terminal device 200.

(ST3) The log monitor running on each partition sends an electronic mail that indicates an error and is directed to the administrator, to the mail server 400. A mail transfer agent running on the mail server 400 stores the received electronic mail in an administrator's mailbox. Then, upon receipt of a POP command from the terminal device 200, the mail transfer agent sends the electronic mails stored in the mailbox to the terminal device 200.

(ST4) The log monitor running on each partition or the MMB firmware stores an error report in the HDD 131 to 133. Then, upon receipt of a Hypertext Transfer Protocol (HTTP) request from the terminal device 200, the MMB firmware sends the error report to the terminal device 200.

Even if the search filter 181 fails to reflect changed formats, the information processing system of the second embodiment makes it possible to reduce the failure of message extraction by using the unknown message search filter 182. It is also possible to improve the accuracy of determining the importance level of a message by generating the unknown message search filter 182 based on the existing search filter 181. Especially, the business server 100 is able to flexibly deal with formality changes such as a change in the number of spaces between words, a change in a delimiter, a change in word order, etc. In addition, filter information defining weights for words is used as the unknown message search filter 182, thus making it easier to perform the filter generation process.

Third Embodiment

The following describes the third embodiment. Different features from the second embodiment will be mainly described, and the same features as the second embodiment will not be described. What are different from the second embodiment are that an information processing system according to the third embodiment employs a different structure for an unknown message search filter and a different method to calculate the importance level of a message.

The information processing system according to the third embodiment may be configured in the same way as that of the second embodiment illustrated in FIG. 2. A business server according to the third embodiment may be realized with the same block configuration as that of the second embodiment illustrated in FIGS. 3 and 6. The following describes a process performed by the business server of the third embodiment by using the same reference numerals as those of FIGS. 2, 3, and 6.

Figure 14:
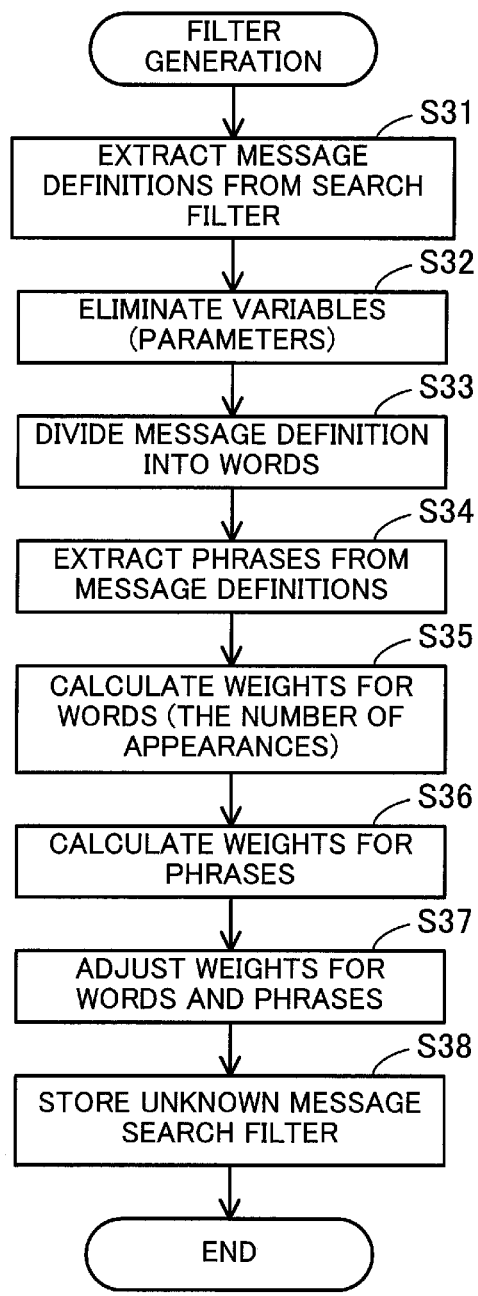
FIG. 14 is a flowchart illustrating a filter generation process according to a third embodiment.

FIG. 14 is a flowchart illustrating a filter generation process according to the third embodiment. The process of FIG. 14 will be described step by step.

(Step S31) The filter generation unit 179 obtains a search filter 181 from a search filter storage unit 162. The filter generation unit 179 then extracts message definitions from the search filter 181.

(Step S32) The filter generation unit 179 eliminates strings (%% . . . %%) representing variables from the message definitions extracted at step S31.

(Step S33) The filter generation unit 179 divides the message definitions obtained after eliminating the variables, into a plurality of words using a predetermined delimiter.

(Step S34) The filter generation unit 179 extracts phrases from the message definitions obtained after eliminating the variables. In this third embodiment, a phrase to be extracted is a string made up of two to any number of words. For example, assuming that a message definition obtained after eliminating the variables is ABC (A, B, C are words), AB, ABC, and BC are extracted as phrases.

(Step S35) The filter generation unit 179 calculates the number of appearances of each word obtained at step S33, that is, the number of message definitions including the word, as a weight for the word.

(Step S36) The filter generation unit 179 calculates a weight for each phrase obtained at step S34 by using the weights for the words calculated at step S35. That is, the filter generation unit 179 calculates a sum of the weights for the words included in the phrase, and sets the calculated value as the weight for the phrase.

(Step S37) The filter generation unit 179 adjusts the weights for the words and phrases, i.e., the weights for the words calculated at step S35 and the weights for the phrases calculated at step S36. For example, the filter generation unit 179 converts the weights calculated at steps S35 and S36 into relative values with a maximum weight of 100.

(Step S38) The filter generation unit 179 generates and stores an unknown message search filter indicating the weights for the words and phrases calculated at step S37, in the search filter storage unit 162. In this connection, the filter generation unit 179 may not register some of the words and phrases obtained at steps S33 and S34 in the unknown message search filter.

FIG. 15 illustrates calculated weights for words and phrases. A weight calculation table illustrated in FIG. 15 is a table that is generated by the filter generation unit 179 through above-described steps S35 and S36. The weight calculation table includes fields for format number (No.), word and phrase, word weight, and phrase weight. A format number corresponds to a format number set in the search filter 181. Words and phrases are words and phrases that are included in message definitions.

A word weight is the weight for a word that is calculated at step S35. The weight for a word may be calculated in the same way as the second embodiment. A phrase weight is the weight for a phrase that is calculated at step S36. For example, the weight for a phrase "failed with" is calculated by adding the weight (=18) for the word "failed" and the weight (=12) for the word "with".

FIG. 16 illustrates a second example of an unknown message search filter. An unknown message search filter 183 is generated and stored by the filter generation unit 179 in the search filter storage unit 162 at above-described step S38.

The unknown message search filter 183 includes fields for index, identifier (ID), word and phrase, and weight. An index is the first letter of a word or phrase. In the unknown message search filter 183, a plurality of words and phrases are arranged in alphabetical order. An identifier is identification information identifying the word in the same index. Words and phrases are words and phrases that are stored in the weight calculation table illustrated in FIG. 15. A weight is the weight for a word or phrase adjusted at above-described step S37.

When generating the unknown message search filter 183, the filter generation unit 179 also records a threshold for the importance levels of messages in the unknown message search filter 183. In this third embodiment, the threshold ranges from 0 to 100. As the threshold is closer to 100, a possibility of deleting messages at the judgment unit 177 becomes higher. On the contrary, as the threshold is closer to 0, the possibility of deleting messages at the judgment unit 177 becomes lower. The administrator specifies a threshold for importance levels to the filter generation unit 179, considering allowance for false detection.

Figure 17:
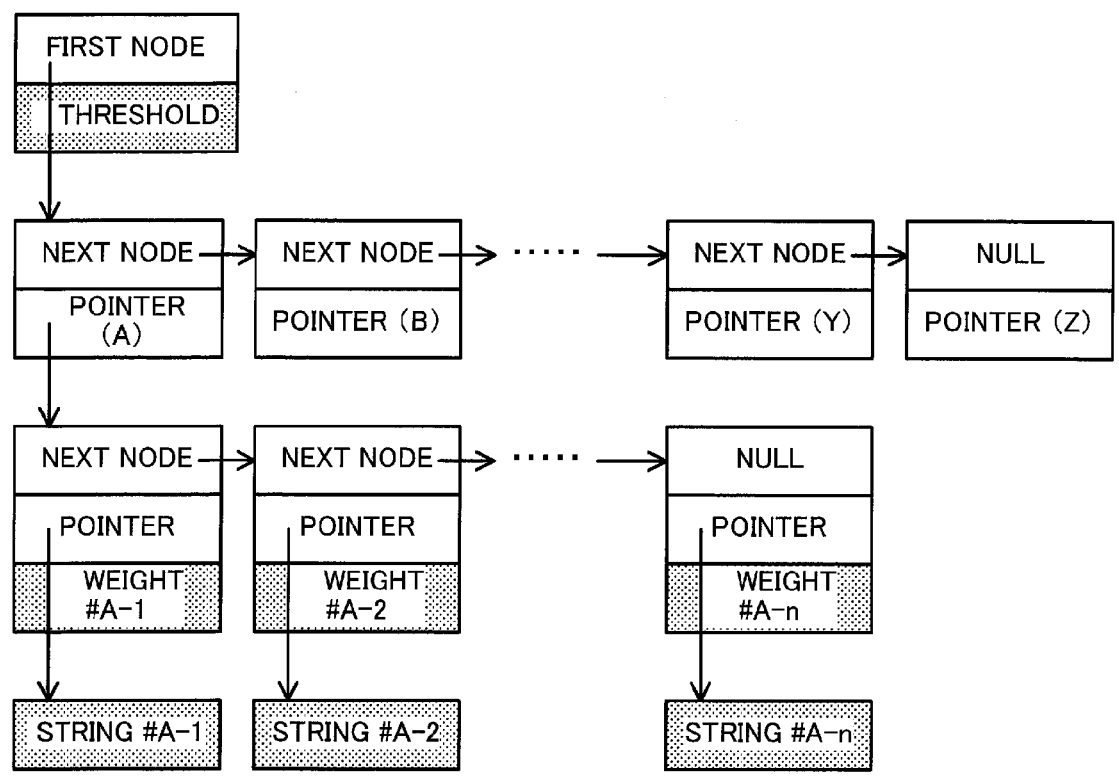
FIG. 17 illustrates a second example of a data structure for an unknown message search filter.

FIG. 17 illustrates a second example of a data structure for an unknown message search filter. The unknown message search filter 183 is stored in a memory in the form of a linear list illustrated in FIG. 17, for example. This data structure of FIG. 17 is just an example, and the data structure for the unknown message search filter 183 is not limited to a linear list.

A linear list for the unknown message search filter 183 includes nodes corresponding to indexes (A to Z). The linear list also includes nodes corresponding to the words and phrases defined by the unknown message search filter 183. Each node corresponding to an index includes a pointer that points to the first node of the nodes corresponding to the words and phrases belonging to the index. Each node corresponding to a word or phrase includes a pointer that points to the first address of a string indicating a word or phrase of variable length, and a numerical value indicating the weight for the word or phrase.

A plurality of nodes corresponding to indexes is linked by unidirectional pointers. A plurality of nodes corresponding to the words and phrases belonging to the same index is linked by unidirectional pointers. A pointer included in the last node is a null pointer. In addition, a set of a pointer that points to the address of the first node (that is, node corresponding to "A") of the nodes corresponding to the indexes and a numerical value indicating a threshold for importance levels is stored in the memory.

As mentioned in the second embodiment, an MMB firmware or another computer (for example, terminal device 200) may generate and distribute the unknown message search filter 183 to each partition of the business server 100.

Figure 18:
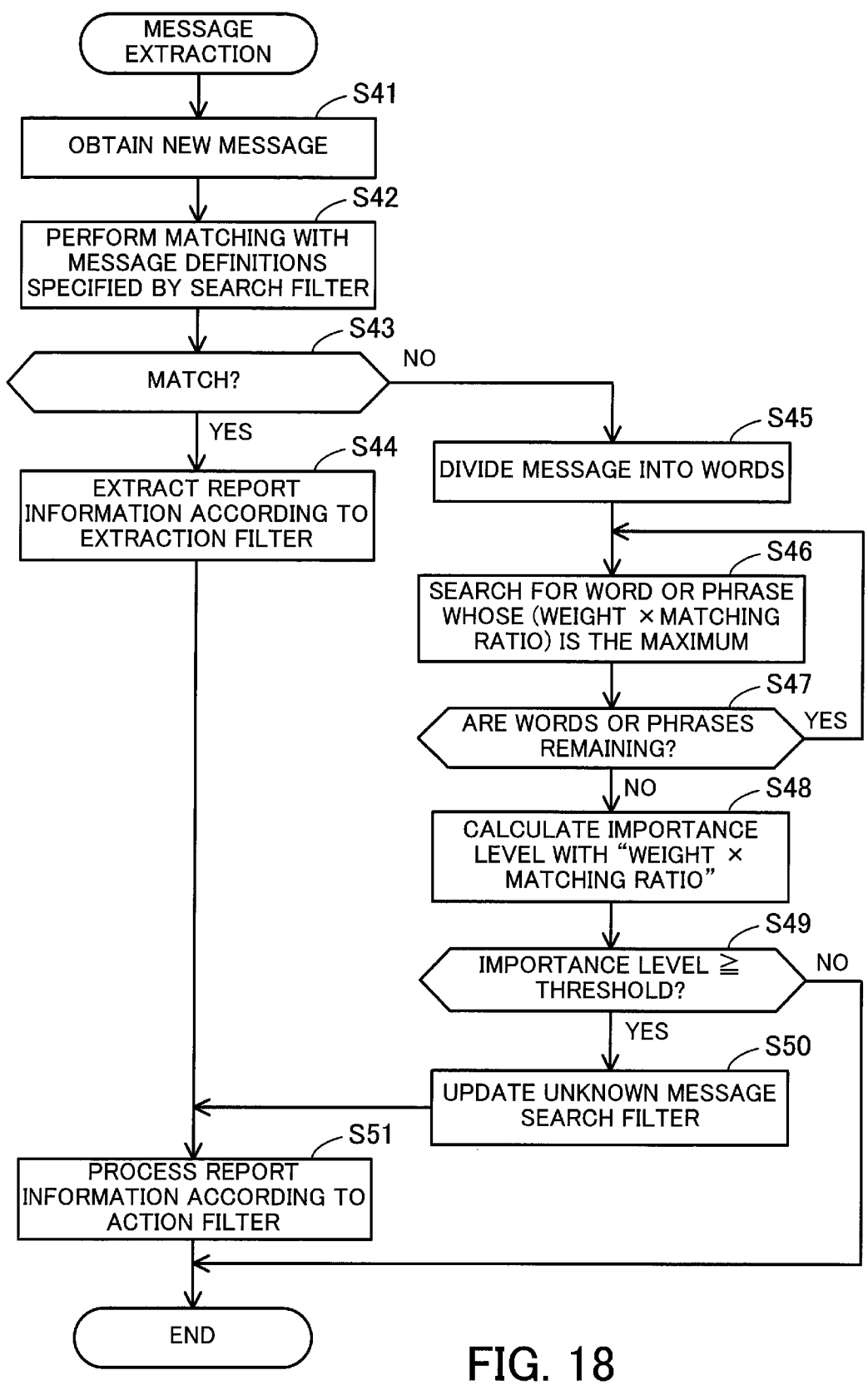
FIG. 18 is a flowchart illustrating a message extraction process according to the third embodiment.

FIG. 18 is a flowchart illustrating a message extraction process according to the third embodiment. The process of FIG. 18 will be described step by step.

(Step S41) The message detection unit 171 detects writing of a new message to a log file stored in the log storage unit 161. The message detection unit 171 then extracts the new message from the log file.

(Step S42) The search unit 173 performs matching between the message extracted at step S41 and the message definitions included in the search filter 181 stored in the search filter storage unit 162.

(Step S43) The search unit 173 determines whether the message extracted at step S41 matches one of the formats defined in the search filter 181, that is, whether the message matches at least one of the message definitions. If the message matches the format, the process proceeds to step S44. Otherwise, the process proceeds to step S45.

(Step S44) The extraction unit 174 extracts information (report information) of a range specified by the extraction filter stored in the extraction filter storage unit 163, from the message obtained from the search unit 173. Then, the process proceeds to step S51.

(Step S45) The word dividing unit 176 divides the message obtained from the search unit 173 into a plurality of words using a predetermined delimiter.

(Step S46) The judgment unit 177 specifies the first letter of a word currently in question in the message. When step S46 is executed for the first time, the first word of the message is taken in question. The judgment unit 177 obtains the words starting with the specified first letter, from the unknown message search filter 183 stored in the search filter storage unit 162. For example, assuming that the specified first letter is "S", the judgment unit 177 obtains the words belonging to the index "S" from the unknown message search filter 183.

Then, the judgment unit 177 selects a word or phrase whose value calculated by multiplying a weight by a matching ratio is the maximum, from the words and phrases obtained from the unknown message search filter 183. The matching ratio is a matching ratio between a word or phrase starting with the word currently in question in the message and the word or phrase obtained from the unknown message search filter 183. Assuming, for example, that a message is ABC (A, B, C are words) and the unknown message search filter 183 includes A, AB, and ABD (D is a word), the judgment unit 177 selects a phrase AB. A matching ratio with words that are not registered in the unknown message search filter 183 is determined to be zero.

(Step S47) The judgment unit 177 eliminates the words or phrases determined to have a match at step S46, from the message. The judgment unit 177 determines whether there are any words or phrases remaining in the message after the matching words and phrases are eliminated. If there are any words or phrases remaining, the judgment unit 177 focuses on the first word of the remaining words and phrases, and proceeds to step S46. If there are no words or phrases remaining, the process proceeds to step S48. Assuming, for example, that a message is ABC, and AB out of ABC matches a phrase included in the unknown message search filter 183, the judgment unit 177 executes step S46 on the remaining word C.

(Step S48) The judgment unit 177 calculates the importance level of the message based on the result obtained by multiplying a weight by a matching ratio with respect to each word or phrase selected at step S46, and the length of the word or phrase in the message determined to have a match at step S46 (the number of letters except spaces). More specifically, the judgment unit 177 calculates the importance level of a message with the following equation:

> Importance level=sum(the length of word or phrase× weight×matching ratio)÷the overall length of a message Assume, for example, that a message is ABC, and AB and C are determined to have a match with words or phrases included in the unknown message search filter 183 at step S46. In this case, the judgment unit 177 calculates the importance level of the message with the following equation:

> (Length of *AB*×weight×matching ratio+length of *C*×weight×matching ratio)÷length of *ABC*

(Step S49) The judgment unit 177 compares the importance level of the message calculated at step S48 with the threshold set in the unknown message search filter 183. If the importance level is greater than or equal to the threshold, the process proceeds to step 49. If the importance level is less than the threshold, the judgment unit 177 deletes the message obtained from the search unit 173, and terminates this process.

(Step S50) The filter generation unit 179 updates the unknown message search filter 183 using the unknown message whose importance level was determined to be greater than or equal to the threshold at step S49. For example, the filter generation unit 179 extracts words and phrases from the unknown message, and adds words and phrases that have not been registered, to the unknown message search filter 183. Alternatively, the filter generation unit 179 may store a list of unregistered words in the search filter storage unit 162, and when an unregistered word is detected a predetermined number of times (for example, three times), move the word from the list to the unknown message search filter 183.

(Step S51) The action execution unit 178 executes an action specified by the action filter stored in the action filter storage unit 164, on the report information obtained from the extraction unit 174 or the message obtained from the judgment unit 177.

In this connection, with respect to step S48, an exemplary method of calculating an importance level has been described. However, an alternative method may be employed to calculate an importance level. Further, the update of the unknown message search filter 183 at above-described step S50 may be performed after step S51. Still further, the filter generation unit 179 may not dynamically update the unknown message search filter 183.

For example, assume that a message is "Start failed (/etc/opt/FJSVpsa/global/pmpsa.conf):Files cannot open", and the unknown message search filter 183 illustrated in FIG. 16 is stored in the search filter storage unit 162.

In this case, the judgment unit 177 performs matching between "Start failed (/etc/opt/FJSVpsa/global/pmpsa.conf): Files", and the phrases with ID=m and ID=m+1 belonging to the index "S". A matching ratio with the phrase with ID=m is calculated as 54÷55=approximately 98%. A result obtained by multiplying the weight by the matching ratio is approximately 78. On the other hand, a matching ratio with the phrase with ID=m+1 is calculated as 55÷55=100%. A result obtained by multiplying the weight by the matching ratio is 80. Therefore, the judgment unit 177 selects the phrase with ID=m+1 belonging to the index "S", and determines that the above portion of the message has been examined for matching.

Then, the judgment unit 177 performs matching between "cannot open" included in the message and a phrase with ID=4 belonging to the index "C". The judgment unit 17 multiplies a weight by a matching ratio, i.e., 30×100%=30, and determines that the remaining portion of the message has been examined for matching. Accordingly, the judgment unit 177 calculates the importance level of the message as (55× 80×100%+12×30×100%)÷(55+12)=approximately 71.

Similarly to the second embodiment, even if the search filter 181 fails to reflect changed formats, the information processing system of the third embodiment makes it possible to reduce the failure of message extraction by using the unknown message search filter 183. In addition, filter information defining weights for phrases in addition to weights for words is used as the unknown message search filter 183, thus making it possible to determine the importance level of a message taking account of the order of words included in the message and to thereby improve the accuracy of determining the importance level of the message.

As described earlier, the log monitoring function of the business server 100 may be realized by using a computer. In this case, a program that describes the processing contents to be executed by the computer is provided. The program may be recorded on a computer-readable recording medium (for example, recording medium 223). Recording media include magnetic disks, optical discs, magneto-optical discs, and semiconductor memories. The magnetic disks include HDDs, FDs, and Magnetic Tapes (MT). The optical discs include CDs, CD-R (Recordable)/RW (Rewritable), DVDs, and DVD-R/RW.

To distribute a program, portable recording media, on which the program is recorded, may be provided. Alternatively, the program may be stored in the storage device of another computer and may be transferred from the computer to the business server 100 through a network. The business server 100 stores in its local storage device (for example, HDD 131 to 133) the program recorded on a portable recording medium or transferred from the other computer, for example, and then loads and executes the program from the storage device. The business server 100 may run the program directly from the portable recording medium. Also, while receiving the program being transferred from the other computer through the network, the business server 100 may sequentially run this program.

The disclosed information processing apparatus, message extraction method, and message extraction program make it possible to reduce the failure of message extraction.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus for obtaining a plurality of messages and extracting one or more messages from the plurality of messages, the information processing apparatus comprising:
    a memory configured to store first filter information specifying formats of messages and second filter information specifying weights for words or phrases; and
    a processor configured to perform a procedure including:
    selecting, from the plurality of messages, messages matching the formats specified by the first filter information as messages to be extracted;
    calculating an importance level of each message that has not been selected based on the first filter information, based on words or phrases included in said each message and the second filter information; and
    selecting messages to be extracted, according to calculated importance levels from messages that have not been selected based on the first filter information.

2. The information processing apparatus according to claim 1, wherein the second filter information is generated based on appearances of words or phrases included in the formats specified by the first filter information.

3. The information processing apparatus according to claim 1, wherein the procedure further includes extracting words or phrases included in the formats specified by the first filter information, and generating the second filter information based on appearances of the extracted words or phrases.

4. The information processing apparatus according to claim 3, wherein the generating includes extracting words and phrases included in the formats specified by the first filter information, calculating weights for the extracted words based on the appearances of the extracted words, and calculating weights for the extracted phrases based on the weights for the extracted words.

5. The information processing apparatus according to claim 1, wherein:
    the second filter information includes information specifying at least weights for phrases; and
    the calculating includes calculating a matching ratio between each phrase included in said each message and a phrase indicated by the second filter information, and calculating the importance level based on the matching ratio and the weights for the phrases specified by the second filter information.

6. The information processing apparatus according to claim 1, wherein the procedure further includes updating the second filter information based on the messages selected based on the second filter information.

7. A message extraction method for obtaining a plurality of messages and extracting one or more messages from the plurality of messages, the message extraction method comprising:
    selecting, by a processor, with reference to first filter information specifying formats of messages, messages matching the formats specified by the first filter information from the plurality of messages as messages to be extracted;
    calculating, by the processor, an importance level of each message that has not been selected based on the first filter information, based on words or phrases included in said each message and second filter information specifying weights for words or phrases; and
    selecting, by the processor, messages to be extracted, according to calculated importance levels from messages that have not been selected based on the first filter information.

8. A computer-readable storage medium storing a computer program for obtaining a plurality of messages and extracting one or more messages from the plurality of messages, the computer program causing a computer to perform a procedure comprising:
    selecting, with reference to first filter information specifying formats of messages, messages matching the formats specified by the first filter information from the plurality of messages as messages to be extracted;
    calculating an importance level of each message that has not been selected based on the first filter information, based on words or phrases included in said each message and second filter information specifying weights for words or phrases; and
    selecting messages to be extracted, according to calculated importance levels from messages that have not been selected based on the first filter information.

* * * * *